UNITED STATES PATENT OFFICE.

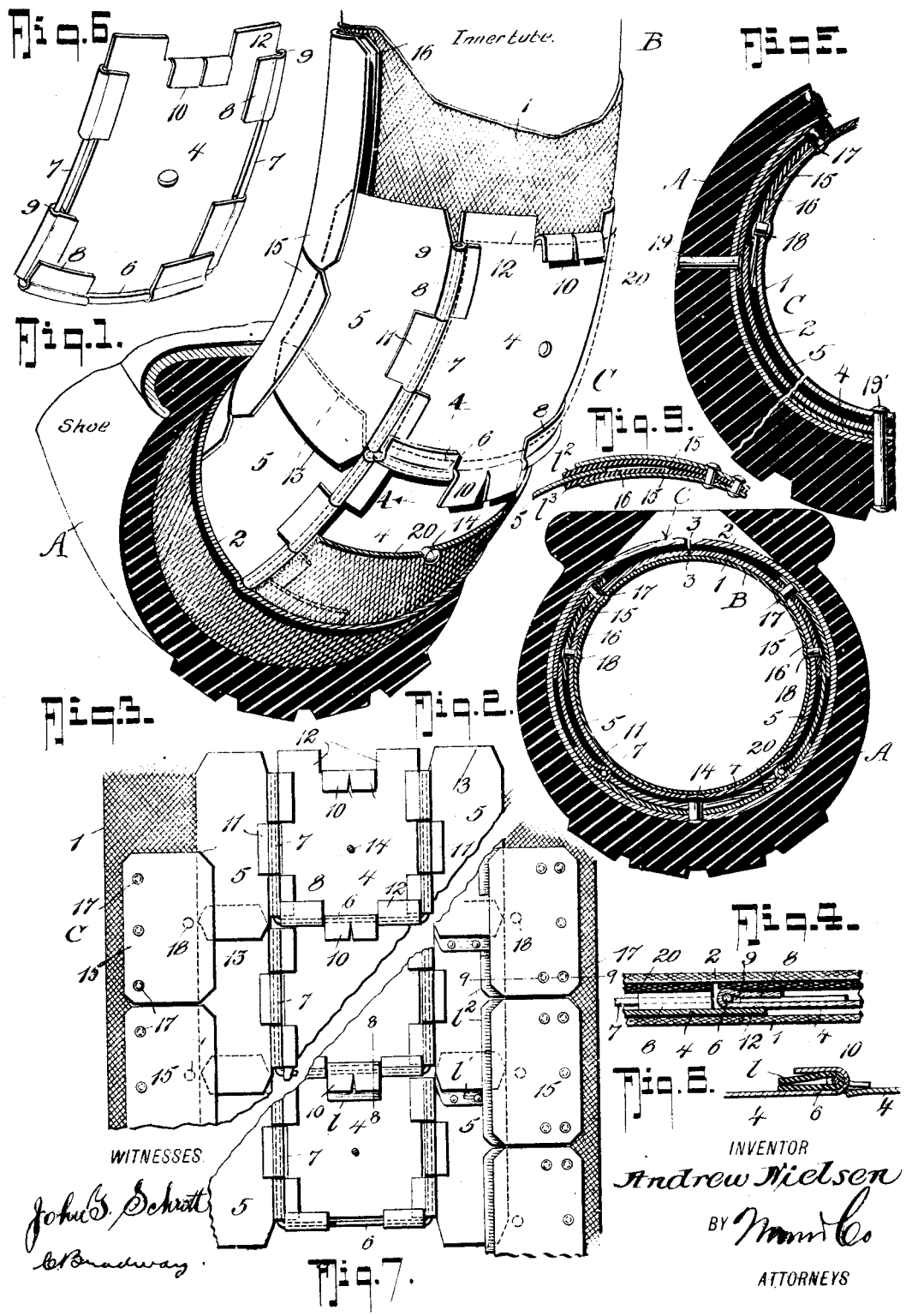

ANDREW NIELSEN, OF BRIGHAM, UTAH.

INTERNAL ARMOR FOR PNEUMATIC TIRES.

1,192,554.　　　　　Specification of Letters Patent.　　Patented July 25, 1916.

Application filed February 7, 1916. Serial No. 76,651.

*To all whom it may concern:*

Be it known that I, ANDREW NIELSEN, a citizen of the United States, and a resident of Brigham city, in the county of Boxelder and State of Utah, have invented a new and Improved Internal Armor for Pneumatic Tires, of which the following is a full, clear, and exact description.

This invention relates to armor for pneumatic tires, and has to deal more particularly with armor of that type which is adapted to be inserted between the inner tube and shoe of the tire so as to prevent the puncture of the inner tube.

The invention has for its general objects to improve the construction of armor of this type so as to be reliable and efficient in use, comparatively inexpensive to manufacture, and so designed as to not impair the resiliency of the tire.

A more specific object of the invention is the provision of an armor which includes a plurality of hingedly connected thin metal plates which effectively cover the major portion of the inner tube so as to prevent nails, glass or other objects from puncturing the inner tube if they should cut through the shoe of the tire, the plates being so disposed and connected together that ample flexibility is provided, and furthermore, the plates are covered with canvas or equivalent fabric so as to prevent wear on the shoe or air tube.

Still another object of the invention is to provide a novel form of detachable hinged connection between the various plates that lie under the tread portion of the shoe so that these plates can be easily and quickly assembled. And furthermore, the armor which includes the middle and lateral hingedly connected plates is provided with pocketed plates into which the free side edges of the lateral plates slide, whereby the armor keeps its form and position when the inner tube is deflated, and whereby the side edges of the lateral plates are prevented from wearing away the tire shoe.

With such objects in view, and others which will appear as the description proceeds, the invention comprises various novel features of construction and arrangement of parts which will be set forth with particularity in the following description and claims appended hereto.

In the accompanying drawings illustrate one embodiment of the invention and wherein similar characters of reference indicate corresponding parts in all the views. Figure 1 is a fragmentary perspective view with portions broken away so as to illustrate the details of construction; Fig. 2 is a transverse section of the tire with the armor therein; Fig. 3 is a view of a portion of the armor stretched out flat with the outer canvas cover removed; Fig. 4 is a detail sectional view on the line 4—4, Fig. 1; Fig. 5 is a detail view showing the armor riveted to the tire shoe; Fig. 6 is a perspective view of one of the series of middle plates of the armor; Fig. 7 is a plan view of a modified form of the protector flattened out like Fig. 3; and Figs. 8 and 9 are detail sectional views respectively on the lines 8—8 and 9—9, Fig. 7.

The armor may be an endless continuous structure and is adapted to have a circular cross-sectional contour when placed in the shoe of a tire, so as to completely surround the inner air tube.

Referring to the drawing, A designates an ordinary tire shoe, B the inner air tube and C the internal armor for preventing puncturing of the inner tube.

The armor comprises an inner and outer covering of canvas 1 and 2 or equivalent fabric, these coverings being of strip form of such width as to entirely transversely cover the inner tube, the edges of the coverings meeting at 3 near the rim or base portion of the tire. Interposed between the canvas coverings 1 and 2 are middle plates 4, which are arcuate in longitudinal transverse planes of the tire. These plates are arranged end to end and form a continuous series around the tread portion, and these middle plates 4 are flanked by lateral plates 5 which are in transverse dimensions somewhat narrower than the middle plates 4. Each middle plate 4 has a pintle 6 at one end and pintles 7 at opposite sides. These pintles are formed by a U-shaped wire so formed as to conform to the marginal outline of the plate 4, and this U-shaped wire structure is fastened to the plate 4 by the latter having bent-back lugs 8 to form apertured ears 9 for holding the wire. The pintles 6 and 7 are disposed slightly beyond the corresponding edges of the plate 4 so that adjacent plates or links can be connected therewith. Each plate 4 at the end opposite from the pintle 6 has a turned-back lug or hook 10 whereby such hook can be engaged with the pintle 6 of the adjacent plate 4, thus hingedly connecting the plates together. The lateral plates 5 have intermediate their ends hook-shaped lugs 11 for engaging the pintles 6.

By thus hingedly connecting the plates 4 together and hingedly connecting the plates 5 to the plates 4, ample flexibility is provided so as not to impair the resiliency of the tire. The plates 4 have outwardly projecting ears 12 at opposite sides of the hook 10 so that these ears will overlap the contiguous end of an adjacent plate 4. In other words, overlapping joints are provided so that there is no danger of the inner tire being punctured at such joints. The ends of the plates 5 overlap each other at 13 for the same purpose. The combined width of the armor formed by the plates 4 and 5 is such that approximately half of the inner tube is covered, as shown in Fig. 2. The hooks 10 and 11 are open far enough to enable them to be snapped over the members 6 and 7 of the pintle in assembling the parts.

The metal part of the armor formed by the plates or links 4 and 5 is held in place between the canvas coverings 1 and 2 by rivets 14 which pass through the centers of the plates 4, and through the canvas coverings. The plates 4 and 5 are free from the canvas coverings at all other points, and furthermore, the canvas coverings are connected together at no other points except at the rivets 14. The inner covering 1 has adjacent each side edge a series of pocket-forming plates 15 into which the outer or free edges of the plates 5 engage or interleave. As the tire is compressed the plates 5 move into the pockets 16 formed by the plates 15, which latter plates are relatively stationary. Thus the free edges of the plates 5 do not rub against the outer canvas covering or shoe, but they have contact with the metal plates 15. These metal plates have their outer portions secured by rivets 17 to the inner covering 1, and if desired the inner portions of the under half of each plate 15 can be secured by a rivet 18 with the said inner covering.

If desired the armor can be separable from the tire shoe, but it will remain firmly in position, especially when the inner tube is inflated. If desired, however, the armor can be permanently fastened to the shoe, as for instance, by the use of rivets 19 which pass through the outer halves of the plates 15 through the outer canvas covering and the shoe A, and rivets 19' which pass through the plates 4 and shoe. Over each plate 4 is a rectangular piece of canvas 20 which serves as a filler between the lugs 8, 10 and 11, so as to provide an even bearing surface for the outer covering 2.

As shown in Figs. 7, 8 and 9, pieces of leather or rawhide are inserted between the metal parts of the protector so as to reduce heating from friction. Thus doubled strips of leather 1 are disposed under the hooks 10; pieces of leather 1' are fastened to the ends of the plates 5 to lie between the overlapping portions of adjacent plates, and pieces of leather 1² and 1³ line the plates 15 so that the plates 5 will slide in and out between the leather pieces 1² and 1³, as shown in Fig. 9. By hingedly connecting the plates 5 with the plates 4 and having the plates 5 slide back and forth in the leather-lined sockets between the plates 15, a maximum flexibility is provided to insure easy running.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. An internal armor for tires, comprising a series of middle plates, a wire extending around three sides of each plate and fastened thereto to form pintles, a hook on each plate for engaging the wire of the next plate, and side plates having hooks engaging the wires of the middle plates, and a flexible covering in the form of strips covering all the plates.

2. An internal armor for tires, comprising a series of middle plates, a wire extending around three sides of each plate and fastened thereto to form pintles, a hook on each plate for engaging the wire of the next plate, and side plates having hooks engaging the wires of the middle plates, a flexible covering in the form of strips covering all the plates, and fabric fillers overlying each middle plate and lying within the margin of each plate and under the covering, whereby the covering will have a substantially smooth support.

3. An internal armor for tires, comprising a series of middle plates, a wire extending around three sides of each plate and fastened thereto to form pintles, a hook on each plate for engaging the wire of the next plate, and side plates having hooks engaging the wires of the middle plates, a flexible covering in the form of strips covering all the plates, and fabric fillers overlying each middle plate and lying within the margin of each plate and under the covering, whereby the covering will have a substantially smooth support, in combination with a tire shoe, and pocketed elements fastened in the tire shoe to receive the outer edges of the side plates, said pocketed elements being in the form of pairs of plates arranged end to end.

In testimony whereof I have signed my name to this specification in the presence of two subscribing witnesses.

ANDREW NIELSEN.

Witnesses:
J. C. JENSEN,
HENRY M. FIGGINS.